(12) United States Patent
Mauchle

(10) Patent No.: US 11,033,916 B2
(45) Date of Patent: Jun. 15, 2021

(54) POWDER-DISPENSING DEVICE AND POWDER-COATING INSTALLATION FOR SPRAYING ARTICLES WITH A POWDER COATING

(71) Applicant: GEMA SWITZERLAND GMBH, St. Gallen (CH)

(72) Inventor: Felix Mauchle, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 48 days.

(21) Appl. No.: 16/522,545

(22) Filed: Jul. 25, 2019

(65) Prior Publication Data

US 2019/0344294 A1    Nov. 14, 2019

Related U.S. Application Data

(63) Continuation of application No. 15/501,389, filed as application No. PCT/EP2015/063720 on Jun. 18, 2015, now Pat. No. 10,406,544.

(30) Foreign Application Priority Data

Aug. 4, 2014    (DE) .......................... 102014215338.7

(51) Int. Cl.
*B05B 7/14* (2006.01)
*B05C 19/04* (2006.01)
(Continued)

(52) U.S. Cl.
CPC .......... *B05B 7/1404* (2013.01); *B05B 7/1459* (2013.01); *B05C 11/1002* (2013.01);
(Continued)

(58) Field of Classification Search
USPC ........ 118/308, 309, 620–640, 683, 695–699, 118/665, 688
See application file for complete search history.

(56) References Cited

U.S. PATENT DOCUMENTS 6,423,142 B1    7/2002  Hughey
8,037,844 B2   10/2011  Mather
(Continued)

FOREIGN PATENT DOCUMENTS

CN    103687673 A    3/2014
DE    19838275 A1   2/2000
(Continued)

OTHER PUBLICATIONS

Brazilian Written Opinion dated Mar. 25, 2020, received for Brazilian Application No. 112017002239, 6 pages.
(Continued)

*Primary Examiner* — Yewebdar T Tadesse
(74) *Attorney, Agent, or Firm* — Kinney & Lange, P.A.

(57) ABSTRACT

A powder-dispensing device in the form of a dense-phase powder pump or of a powder injector is provided to deliver coating powder from a powder reservoir to a powder-spraying device. To make the spray coating operation easier for the customer and to be able to make it more cost-effective, without having to compromise on good coating quality and good coating efficiency, a control device is integrated in the powder-dispensing device or is connected, in particular directly, to the powder-dispensing device and is designed to establish at least one parameter that is characteristic of a spray coating procedure carried out with the powder-coating device.

7 Claims, 2 Drawing Sheets

(51) Int. Cl.
  *B05C 11/10* (2006.01)
  *B65G 53/28* (2006.01)
  *B65G 53/04* (2006.01)
  *B65G 53/34* (2006.01)
  *B65G 53/52* (2006.01)
(52) U.S. Cl.
  CPC .............. *B05C 19/04* (2013.01); *B65G 53/28* (2013.01); *B65G 53/04* (2013.01); *B65G 53/34* (2013.01); *B65G 53/525* (2013.01)

(56) References Cited

U.S. PATENT DOCUMENTS

| | | | |
|---|---|---|---|
| 10,406,544 B2 * | 9/2019 | Mauchle | ............... B05B 7/1404 |
| 2002/0046702 A1 | 4/2002 | Browning | |
| 2002/0088397 A1 | 7/2002 | Perkins | |
| 2003/0116086 A1 | 6/2003 | Schroeder | |
| 2005/0229845 A1 | 10/2005 | Mather | |
| 2009/0229517 A1 | 9/2009 | Ko | |
| 2010/0212589 A1 | 8/2010 | Mauchle | |
| 2013/0173832 A1 | 7/2013 | Calvin | |
| 2015/0367788 A1 | 12/2015 | Hudina | |

FOREIGN PATENT DOCUMENTS

| | | |
|---|---|---|
| DE | 19903578 A1 | 8/2000 |
| DE | 19913448 A1 | 9/2000 |
| DE | 20209377 U1 | 10/2003 |
| DE | 10335420 A1 | 2/2005 |
| DE | 10357814 A1 | 7/2005 |
| DE | 102007041551 A1 | 3/2009 |
| DE | 102007049169 A1 | 4/2009 |
| DE | 102011004352 A1 | 8/2012 |
| EP | 1644131 B1 | 8/2007 |
| JP | 5959262 A | 4/1984 |
| WO | 2012112436 A1 | 8/2012 |

OTHER PUBLICATIONS

Indian Examination Report dated Feb. 25, 2020, received for Indian Application No. 201717005593, 5 pages.
International Search Report and Written Opinion dated Oct. 27, 2015, for corresponding PCT Application No. PCT/EP2015/063720.
First German Office Action dated May 13, 2015, for corresponding German Application No. 102014215338.7.
Second German Office Action dated Jul. 24, 2015, for corresponding German Application No. 102014215338.7.
Chinese Office Action dated Nov. 13, 2018, for corresponding Chinese Application No. 201580040013.4.
International Preliminary Report on Patentability for PCT Application No. PCT/EP20185/063720, dated Feb. 7, 2017.

* cited by examiner

POWDER-DISPENSING DEVICE AND POWDER-COATING INSTALLATION FOR SPRAYING ARTICLES WITH A POWDER COATING

CROSS-REFERENCE TO RELATED APPLICATION(S)

This application is a continuation of U.S. application Ser. No. 15/501,389 filed on Feb. 2, 2017, which in turn is the national phase of PCT Application No. PCT/EP2015/063720 filed on Jun. 18, 2015, which in turn claims priority to German Application No. 102014215338.7 filed on Aug. 4, 2014, all of which are incorporated by reference herein in their entireties.

BACKGROUND

The present invention relates to a powder-dispensing device.

Accordingly, embodiments of the present invention relate in particular to a powder-dispensing device in the form of a dense phase powder pump or a powder injector for conveying coating powder from a powder reservoir to a powder-spraying device. Embodiments of the invention relate in particular to both those powder-dispensing devices and powder spray coating devices comprising an injector as the powder pump as well as those comprising a dense phase powder pump.

Dense phase powder pumps in the sense of the present disclosure have at least one feed chamber provided with a powder intake valve and a powder outlet valve. The feed chamber can be alternatingly connected to a vacuum source during a suction stage or to a source of compressed conveying air during a dispensing stage. The vacuum of the vacuum source sucks powder in the feed chamber through the open powder intake valve while the powder outlet valve is closed. The compressed conveying air from the compressed conveying air source dispenses the powder from the feed chamber through the open powder outlet valve while the powder intake valve is closed.

According to one aspect of the present invention, the powder-dispensing device is designed as a single-chamber dense phase powder pump, whereby the dense phase powder pump only comprises one single powder feed chamber for conveying the coating powder.

According to a further aspect of the invention, however, a dense phase powder pump is provided which makes use of at least two feed chambers connected in parallel. With the use of at least two parallel-connected feed chambers, powder is in each case sucked into one of the at least two feed chambers while powder is dispensed out of the other of the at least two feed chambers, whereby the powder is then dispensed from the one feed chamber and new powder is sucked into the other chamber. The parallel connection of two or more feed chambers can produce a continuous flow of powder in a powder-dispensing line connected to the powder outlet valves of all the feed chambers, particularly without supplementary compressed conveying air needing to be fed into the powder path in phase opposition to the powder dispensing after the feed chamber.

Different types of powder-dispensing devices implemented as dense phase powder pumps are known, for example from the following documents: JP 09/071325 A, DE 196 11 533 B4, EP 1 644 131 A2, WO 2004/087331 A1 and EP 1 566 352 A2.

These dense phase powder pumps known from the prior art have at least one, usually two feed chambers. A vacuum inlet of the feed chamber, in some embodiments also a compressed air inlet of the feed chamber, is provided with a filter which is permeable to air but impervious to coating powder. It is customary to use sintered material as the material for the filter. The powder intake valve and the powder outlet valve are usually pinch valves, which have already proven effective in combination with injector pumps in dilute phase conveying of powder because they are less prone to powder depositing in them and because the gas flowing through them, normally a flow of pressurized air, makes them easier to clear than other types of valves.

The amount of powder delivered by a dense phase powder pump per unit of time is particularly dependent on the size (volume) of the feed chamber, the frequency at which coating powder is sucked into the feed chamber and then dispensed from it again, the force of the vacuum for the length of time the powder intake valve is open during the suction phase, and the flow resistances in the powder lines upstream and in particular downstream of the dense phase powder pump. The flow resistances are particularly dependent on the length and the internal cross section of the powder supply lines, usually powder hoses. The compressed conveying air only mixes minimally with the coating powder and pushes the coating powder out of the feed chamber through the powder outlet valve.

A different type of pump, which likewise relates to the invention, is an injector or injector pump respectively, by means of which coating powder is sucked into a conveying flow of air and then mixed with the conveying flow of air fed through a dispensing line (powder supply line) to a powder-spraying device. Such a powder feed can also be referred to as dilute phase powder conveyance.

This type of powder-dispensing device for dilute phase conveying of powder is known for example from printed publication EP 0 606 577 B1 or U.S. Pat. No. 4,284,032.

Specifically, the U.S. Pat. No. 4,357,900 printed publication discloses a powder spray coating device with which objects to be coated are transported through a chamber and are coated in the chamber by automatic spray devices subject to sensors, whereby a sensor serves to notify a control device when an object to be coated has been transported into the chamber so that the relevant powder spray device will then be activated.

In contrast to the dense phase conveying of powder, other conditions apply to dilute phase powder conveyance since it makes use of an injector as the powder pump to convey the coating powder. A flow of compressed conveying air creates a negative pressure in the injector. The negative pressure sucks coating powder into the flow of compressed conveying air. The mixture of compressed conveying air flow and powder then flows from the injector toward, for example, a powder-spraying device attached to the powder-dispensing device. The amount of powder delivered by the injector per unit of time depends on the volume of compressed conveying air flowing through the injector per unit of time.

SUMMARY

Disclosed herein is a technical solution for making the spray coating operation easier and less expensive for the customer without having to compromise good coating quality and good coating efficiency.

Thus, a powder-dispensing device in the form of a dense phase powder pump or a powder injector is in particular proposed, wherein the powder-dispensing device serves to convey coating powder from a powder reservoir or similar powder container to a powder-spraying device. In accordance with embodiments of the invention, a control device is provided which is integrated into the powder-dispensing device or is connected, particularly directly, to the powder-dispensing device. The control device is designed to set at least one parameter which is characteristic in respect of a spray coating process effected with the powder-spraying device.

The at least one parameter, which is characteristic in respect of a spray coating process effected with the powder-spraying device, is for example an electrode spray current of one or more high-voltage electrodes of the powder-spraying device, a high voltage at one or more high-voltage electrodes of the powder-spraying device, a volume of electrode flushing air supplied to the powder-spraying device per unit of time, a volume of shaping air to be supplied to the powder-spraying device per unit of time, or a volume of compressed conveying air to be supplied to the powder-spraying device together with the coating powder per unit of time.

It is particularly preferentially provided for the control device to comprise at least one manually operable parameter adjuster element for setting a parameter target value for the at least one characteristic parameter of a spray coating process effected with the powder-spraying device. In this respect, it is of further advantage for the control device to comprise a visual display unit which can preferably automatically display the at least one set parameter target value.

In conjunction hereto, it can also be provided for the control device to comprise an interface connection as a lead for a communication bus of the control device. This serves in enabling a remote control (external control) to set the at least one parameter. Alternatively or additionally, the communication bus serves in communicating the at least one set parameter target value to a remote processing unit.

This hereby achieves the advantage of the control unit also being able to be remotely controlled as needed. In particular, control is thus also possible in automatic mode—and also when the control device itself is not provided with any manually operable adjuster and/or any visual display unit. Even when these elements are provided, both an automatic mode as well as manual control operation can thus advantageously be provided.

Advantageously, the communication bus is designed as a field bus system. Particularly signal-strong and standardized field bus systems such as, for example, a CAN bus or a PROFIBUS, can thereby be used to enable simple integration into existing automated systems.

The powder-dispensing device according to embodiments of the invention (dense phase powder pump or powder injector) is thus accorded—in contrast to conventional powder-dispensing devices known from the prior art—a dual function:

Firstly, the powder-dispensing device serves in the conveying of coating powder from a powder reservoir to a powder-spraying device fluidly connected to the powder-dispensing device.

Secondly, however, the powder-dispensing device also serves to appropriately control the powder-spraying device fluidly connected to the powder-dispensing device in order to spray the coating powder fed from the powder-dispensing device of the powder-spraying device onto the objects to be coated. In other words, the disclosed solution in particular achieves the advantage of being able to dispense with separately realized electronic controllers so that the overall powder-coating system can be of more compact and clearly arranged design. Integrating the control device into the powder-dispensing device also does away with the otherwise typical complex wiring or connecting of compressed air lines, as they can preferably be realized right at the compressed air connection of the powder-dispensing device.

The control device integrated into the powder-dispensing device, or in particular connected directly to the powder-dispensing device respectively, preferably serves not only to control a powder-spraying device connected to the powder-dispensing device but also to set the parameter which is characteristic in respect of a powder conveyance effected with the powder-dispensing device. This relates in particular to an amount of coating powder to be conveyed by the powder-dispensing device per unit of time and a volume of compressed conveying air to be conveyed with the coating powder per unit of time.

The disclosed powder-dispensing device is suited for automatic spraying devices (automatic guns) and for manual spraying devices (manual guns). Particularly in the case of manual spraying devices, however, the coating quality and the efficiency are very strongly dependent on the experience of the operator. It is therefore provided according to a further development of the disclosed solution for the control device to be designed to perform spraying coating processes, whereby the control device comprises a storage device having a plurality of spraying coating programs to this end, and these in fact not only with variable parameters but also with unchangeable parameters. The unchangeable parameters are in particular those which are especially critical to the coating quality and/or the efficiency and require a great deal of experience in precisely setting the parameters, for example the high voltage of high-voltage electrodes for electrostatically charging the coating material and preferably also the electrode current. The unchangeable parameters are set to parameter values which have proven particularly advantageous in practice.

According to a further aspect, the present invention further relates to a powder-coating system for spraying objects with a powder coating, whereby the powder-coating system comprises a powder-dispensing device of the above-cited type and at least one powder-spraying device connected to the powder-dispensing device by a powder supply line. The powder-coating system is in particular characterized by all the parameters which are able to be set in terms of operating the at least one powder-spraying device being able to be set by the control device of the powder-dispensing device. This consequently enables a particularly compact system design making for easier and less expensive spray coating operation for the customer without having to compromise good coating quality and good coating efficiency.

BRIEF DESCRIPTION OF THE DRAWINGS

The following will reference the accompanying drawings in describing the disclosed solution in greater detail by way of an example embodiment.

Shown are.

DETAILED DESCRIPTION

Figure 1:
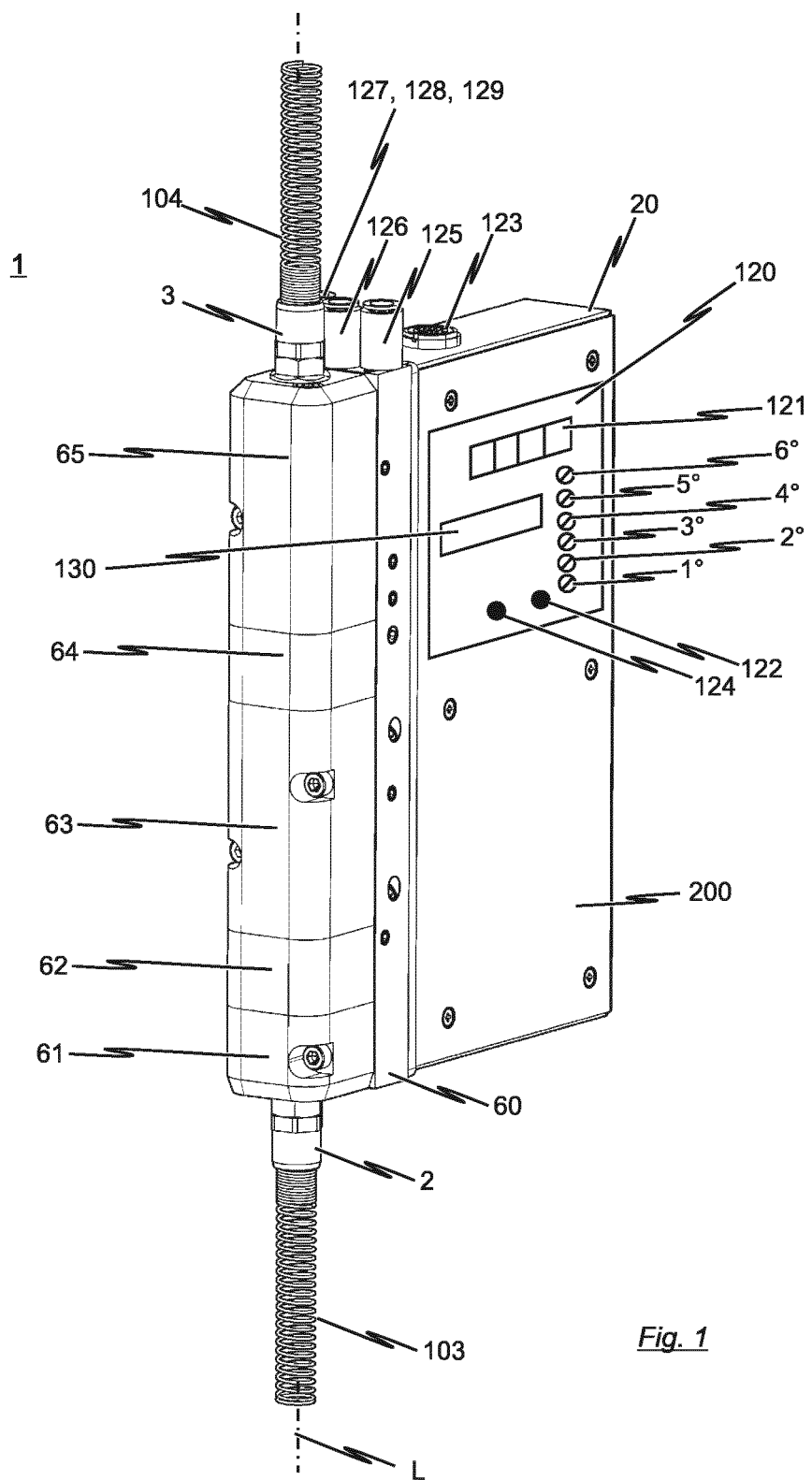
FIG. 1: a perspective view of an example embodiment of a powder-dispensing device.
Figure 2:
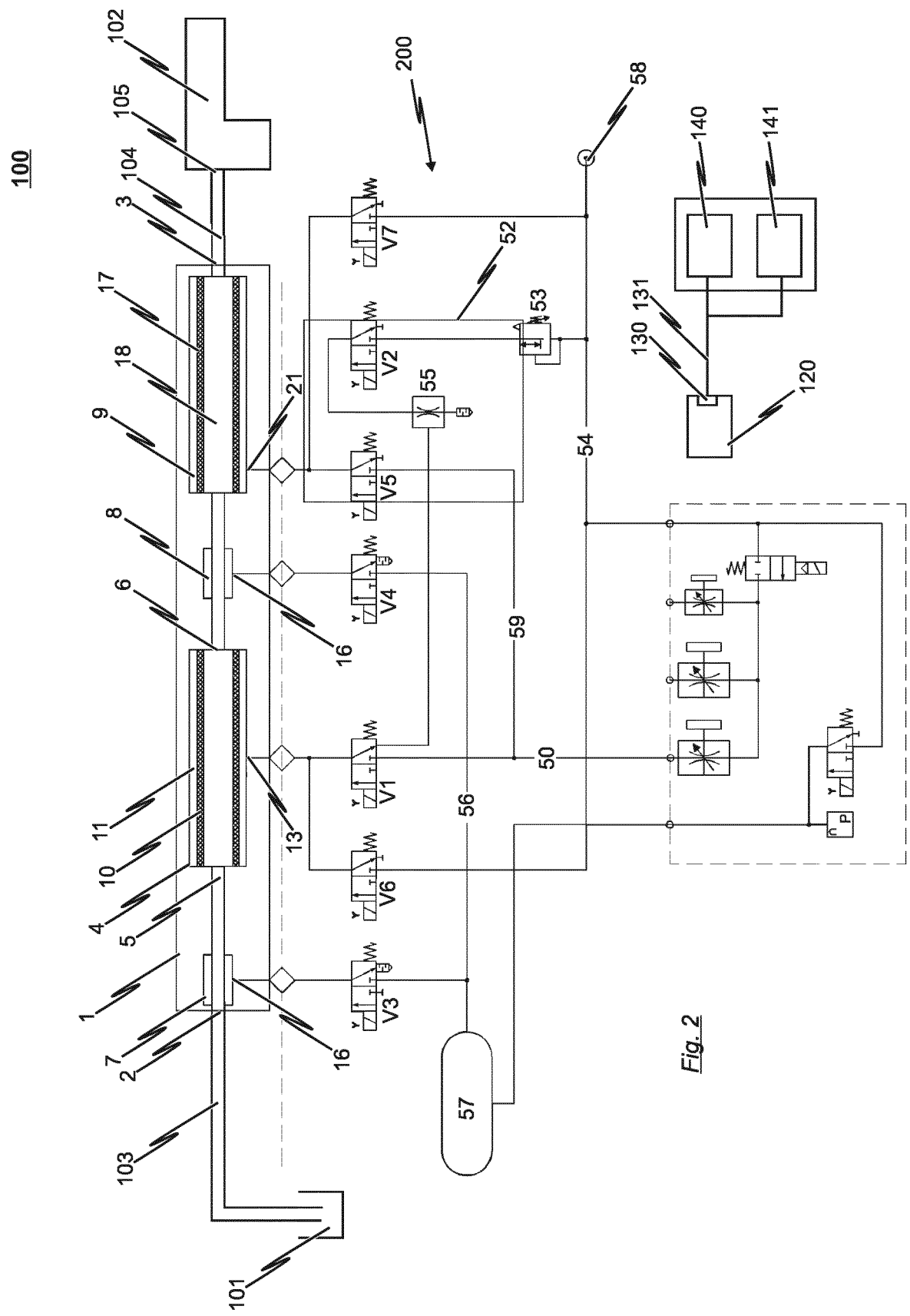
FIG. 2: a schematic view of a powder-coating system for powder spray coating objects, wherein the powder-coating system of the example embodiment shown in FIG. 1 comprises the powder-dispensing device.

The following will reference the depictions in FIGS. 1 and 2 in describing an example embodiment of the powder-dispensing device 1 as well as schematically illustrating a powder-coating system 100 comprising such a powder-dispensing device 1.

Although it is of course also conceivable to configure the powder-dispensing device 1 as a dilute phase powder pump, the powder-dispensing device 1 is designed as dense phase powder pump in the example embodiment depicted in the figures which serves in a powder-coating system 100 to convey coating powder from a powder reservoir 101 to a powder spray coating gun or powder-spraying device 102 arranged downstream of the dense phase powder pump 1. A different device for spraying coating powder onto an object to be coated can also be used in lieu of the powder spray coating gun 102.

As depicted schematically in FIG. 2, the example embodiment of the powder-dispensing device 1 employed therein comprises a powder inlet 2 which is fluidly connected or connectable to the powder reservoir 101 via a powder line 103, in particular via a suction tube or the like. A powder outlet 3 is provided in the opposite end region of the powder-dispensing device 1 which is connected or connectable to a coating powder inlet 105 of the powder spray coating gun 102 via a powder line 104, in particular via a powder hose.

In detail, both the powder inlet 2 as well as the powder outlet 3 of the powder-dispensing device 1 are each designed as hose connectors in the example embodiment, to which the corresponding powder line 103/104 can be attached and secured by a hose clip. Of course other embodiments are also conceivable for the powder inlet 2 and/or powder outlet 3.

The powder-dispensing device 1 according to the depicted embodiment is designed as a single-chamber dense phase powder pump, wherein only one single powder feed chamber 4 is provided for conveying coating powder from the powder reservoir 101 to the powder spray coating gun 102 or to another powder-spraying device respectively for spray coating objects. The (single) powder feed chamber 4 comprises a powder inlet 5 at a first end region facing in the direction of the powder inlet 2 of the powder-dispensing device 1. The powder feed chamber 4 further comprises a powder outlet 6 facing in the direction of the powder outlet 3 of the powder-dispensing device 1. A powder intake valve 7 is arranged directly adjacent the powder inlet 5 of the powder feed chamber 4 and in such a manner that the powder intake valve 7 lies between the powder inlet 5 of the powder feed chamber 4 and the powder outlet 2 of the powder-dispensing device 1. Similarly, a powder outlet valve 8 is arranged directly adjacent the powder outlet 6 of the powder feed chamber 4.

Unlike the powder intake region of the powder-dispensing device 1, however, the powder outlet valve 8 at the powder outlet region of the powder-dispensing device 1 is not arranged directly between the powder outlet 6 of the powder feed chamber and the powder outlet 3 of the powder-dispensing device 1; on the contrary, an auxiliary compressed air intake device 9 is still arranged between the powder outlet valve 8 and the powder outlet 3 of the powder-dispensing device 1. As will be described in greater detail below, this auxiliary compressed air intake device 9 serves to feed supplemental compressed conveying air into the powder path between the powder outlet valve 8 and the powder outlet 3 of the powder-dispensing device 1 when needed.

It is to be noted at this point that it is not imperative for the auxiliary compressed air intake device 9 to be arranged between the powder outlet valve 8 and the powder outlet 3 of the powder-dispensing device 1. The effects which can be achieved with the auxiliary compressed air intake device 9, which will be described in greater detail below, can also be realized when the auxiliary compressed air intake device 9 is arranged after the powder outlet 3 of the powder-dispensing device 1.

As can be seen in particular from the representation provided in FIG. 1, the powder inlet 2 of the powder-dispensing device 1, the powder intake valve 7, the powder inlet 5 of the powder feed chamber 4, the powder feed chamber 4, the powder outlet 6 of the powder feed chamber 4, the auxiliary compressed air inlet device 9 as well as the powder outlet 3 of the powder-dispensing device 1 lie along a common longitudinal axis L. In other words, the powder inlet 2 of the powder-dispensing device 1 is situated at the opposite end from the powder outlet 3 of the powder-dispensing device 1.

As shown by the schematic representation provided in FIG. 2, the powder feed chamber 4 is formed between its powder inlet 5 and its powder outlet 6 by the cylindrical wall of a tube-like filter 10 which is permeable to air but not to coating powder and can be comprised for example of sintered material. The filter 10 configured as a filter tube is enclosed by an intermediate chamber 11, the exterior of which is delimited by a housing of the powder feed chamber 4.

An air exchange opening 13 which is fluidly connected to a control valve V1 leads through the housing. The control valve V1 can alternatingly supply the powder feed chamber 4 with compressed conveying air from a compressed air supply line 50 or subject it to the vacuum or negative pressure of a vacuum source 52.

In embodiments as depicted schematically in FIG. 2, the vacuum source 52 comprises an injector 55 which supplies compressed injector air from a compressed air supply line 54, or a compressed air source 58 respectively, by way of e.g. a pressure regulator 53 and a further control valve V2.

In order to be able to suction coating powder from the powder reservoir 101 into the powder feed chamber 4 through the powder inlet 2 of the powder-dispensing device 1 during a suction phase of the powder-dispensing device 1, the powder outlet valve 8 arranged at the powder outlet 6 of the powder feed chamber 4 is closed and the powder intake valve 7 arranged between the powder inlet 2 of the powder-dispensing device 1 and the powder inlet 5 of the powder feed chamber 4 opened. At the same time that the powder outlet valve 8 and the powder intake valve 7 are actuated, or immediately thereafter, the control valve V1 and associated air exchange opening 13 connect the powder feed chamber 4 to the vacuum source 52 so as to subject the powder feed chamber 4 to a negative pressure and coating powder can be sucked out of the first powder reservoir 101.

After coating powder has been drawn into the powder feed chamber 4, a change is effected from the suction phase to the discharge phase of coating powder from the feed chamber 4. To this end, powder intake valve 7 is closed and powder outlet valve 8 opened while the control valve V1 provides a fluid connection between the air exchange opening 13 and the compressed air supply line 50 so that the portion of coating powder previously sucked into the powder feed chamber 4 will be discharged through the open powder outlet valve 8 by means of the compressed conveying air supplied via the air exchange opening 13 during the suction phase.

Thereafter, the operating mode of suctioning in coating powder through the powder inlet 2 of the powder-dispensing device 1 and through the open powder intake valve 7 repeats. This change in operating phases repeats continuously.

The term "pump cycle" as used herein is to be understood as a cycle consisting of one suction phase and one discharge phase.

The valves arranged at the intake and outlet side of the powder feed chamber 4 (powder intake valve 7, powder outlet valve 8) are preferably each designed as pinch valves, whereby, however, different types of valves are in principle also conceivable.

The powder inlet and powder outlet valves 7, 8 respectively designed as pinch valves in the example embodiment depicted in the drawings each comprise a respective flexible elastic tube which serves as the valve channel. In order to close the respective valve (powder intake valve 7, powder outlet valve 8), the flexible elastic tube can be squeezed together by actuating compressed air within a pressure chamber surrounding the flexible elastic tube.

To this end, each pressure chamber is provided with an air exchange opening 16 connected to a respective control valve V3, V4. The control valves V3, V4 serve in alternatingly subjecting the pressure chamber of the two powder inlet/powder outlet valves 7, 8 respectively designed as pinch valves to positive pressure from a compressed air supply line 56.

As depicted, the compressed air supply line 56 is connected to a pressure accumulator 57, whereby the pressure accumulator 57 is for its part connected to a compressed air source 58. It is of course also conceivable for the compressed air supply line 56 to be connected directly to the compressed air source 58 (i.e. without the interposition of a pressure accumulator 57).

The flexible elastic tube of the powder intake valve 7/powder outlet valve 8 designed as a pinch valve preferably has such an elasticity or residual stress that it autonomously stretches out again after the pressure of the actuating compressed air ceases in the pressure chamber and thereby opens the respective valve channel. To support the opening of the pinch valve and thus increase the realizable switching frequency of the powder-dispensing device 1, it is conceivable for a negative pressure to be applied via the corresponding air exchange openings 16.

Various measures are provided in order to achieve a homogeneous powder flow without disruptive pulsations downstream of the powder outlet 3 of the powder-dispensing device 1 in the powder-dispensing device 1 depicted in the drawings and configured as a single-chamber dense phase powder pump.

For example, the powder-dispensing device 1 is structurally designed and constructed such that the pumping frequency attainable with the powder-dispensing device 1 can be increased compared to conventional multi-chamber dense phase powder pumps. To this end, the disclosed solution makes use of a block of material 60 (see FIG. 1) in advantageous realizations of the powder-dispensing device 1, to which can be attached the powder intake valve 7 needed to convey coating powder as well as the powder outlet valve 8 likewise needed to convey coating powder, including the control valves V3, V4 needed to actuate said valves 7, 8, (not explicitly shown in the figures). Both the powder intake valve 7 as well as the powder outlet valve 8 and the necessary control valves V3, V4 for their actuation are preferably connected to channels formed in the material block 60 (not depicted in the figures). The same also applies to the control valve V1 which is fluidly connected to the air exchange opening 13 of the powder feed chamber 4 via at least one channel formed in the material block 60.

Having the corresponding control valves V1, V3 and V4 as well as the powder intake and powder outlet valves 7, 8 being arranged as close as possible to the components of the powder-dispensing device 1 to be operated avoids large volumes in the respective pressure lines to the pneumatically-activated valves 7, 8 or in the respective pressure lines to the air exchange opening 13 of the powder feed chamber 4 which would need to be alternatingly evacuated or filled with compressed air during the alternating operation of the powder-dispensing device 1. This can thus prevent excessive reaction delay times, which would ultimately also limit the frequency at which the powder-dispensing device 1 can deliver coating powder.

As can be noted particularly from the representation provided in FIG. 1, the powder-dispensing device 1 advantageously exhibits a modular structure, wherein the "powder inlet 2 of the powder-dispensing device 1," "powder intake valve 7," "powder feed chamber 4," "powder outlet valve 8" and "auxiliary compressed air intake device 9" components together with the "powder outlet 3 of the powder-dispensing device 1" are in each case designed as a modular component. The module which forms the powder inlet 2 of the powder-dispensing device 1 is identified in the figures by the reference numeral "61" while the module 62 arranged downstream thereof constitutes the powder intake valve 7. Modules 63 and 64 form the powder feed chamber 4 and the powder outlet valve 8 while module 65 forms the combination of the auxiliary compressed air intake device 9 and the powder outlet 3 of the powder-dispensing device 1. The individual modules 61, 62, 63, 64 and 65 are mounted axially aligned and in succession on the material block 60 relative to the common longitudinal axis L.

The modular structure to the powder-dispensing device 1 considerably simplifies maintenance of the pump since the pump's individual modules 61, 62, 63, 64 and 65 along with the respective components can be replaced particularly easily and particularly quickly when necessary, for example in the event of a malfunction or for maintenance and/or cleaning purposes.

In the example embodiment of the powder-dispensing device 1, the above-cited auxiliary compressed air intake device 9 is in particular provided for the purpose of reducing or respectively preventing pulsations downstream of the powder outlet 3 of the powder-dispensing device 1, same being arranged at the inlet of the powder outlet valve 8, or at the powder outlet 3 of the powder-dispensing device 1 respectively, so as to be able to feed supplemental compressed conveying air into the powder path as needed.

According to one exemplary realization of the auxiliary compressed air inlet device 9, same comprises a filter tube 17 having a circumference of at least 180° (in the depicted embodiments, the circumference is 360° and forms a channel wall inner surface over at least 180° of the powder path circumference (in the embodiments depicted in the figures, a 360° channel wall inner surface) over at least part of the length of the respective powder path.

A compressed air chamber configured as an annular compressed air chamber in accordance with the FIG. 2 depiction encloses the outer circumference of the filter tube 17. The compressed air chamber configured here as an annular compressed air chamber is enclosed at its radially inner circumference by the filter tube 17 and at its radially outer circumference, and at a distance from the filter tube 17, by a housing. An air exchange opening 21 is realized in the housing, via which compressed air from a compressed air line 59 can flow into the compressed air chamber via a control valve V5 when needed and from there, through the filter tube 17 into the filter tube channel 18.

The volume of compressed conveying air fed into the powder path per unit of time can be kept so low as to have no or only slight influence on the flow rate of the coating powder in the flow path. There is the additional possibility of increasing the flow volume by increasing the pressure of the additional compressed conveying air fed in by means of the auxiliary compressed air inlet device 9 in order to influence the flow rate of the coating powder.

According to a further advantageous embodiment, the pulse frequency of the supplemental compressed air supplied by the auxiliary compressed air inlet device 9 can be set as a function of the powder-dispensing frequency of the powder feed chamber 4 in at least one of the following ways: for example manually and/or preferably automatically controlled or preferably adjustably. The auxiliary compressed air pulse frequency can thereby be advantageously increased with increasing powder-dispensing frequency and reduced with decreasing powder-dispensing frequency.

The powder-dispensing device 1 comprises an integrated control device 120 which—as FIG. 1 shows—forms a structural unit with the housing 20 of the powder-dispensing device 1. The control device 120 serves to control the controllable components of the powder-dispensing device 1 on the one hand and, on the other, to control the controllable components of a powder-spraying device 102 connected to the powder-dispensing device 1. The control device 120 preferably comprises at least one visual display unit 121 having one or more display panels to visually display operating values, e.g. target and/or actual values.

The powder-spraying device 102 fluidly connected to the powder-dispensing device 1 preferably comprises a high-voltage generator which, in accordance with other embodiments, can also be arranged external of the powder-spraying device 102 for generating high voltage for at least one high-voltage electrode arranged in or adjacent the coating powder flow path for electrostatically charging the coating powder.

The control device 120 has a computerized device control for operating the powder-spraying device 102 and the powder-dispensing device 1. The control device 120 comprises an electrical energy input 122 (power outlet, power connection) for supplying electrical energy to the control device.

The control device 120 is further provided with an electrical energy output 123 for delivering a low voltage to the high-voltage generator of the powder-spraying device 102. The low voltage at the low-voltage output 123 is generated by the device control from the electrical energy of the energy input 122 as a function of the high-voltage setting on a high-voltage adjuster 1° of the control device 120.

The lead end of a low-voltage cable can be connected to the energy output 123 of the control device 120 for supplying low voltage to the high-voltage generator of the powder-spraying device 102.

The control device 120 further comprises a compressed air inlet 124 connectable to the compressed air source 58 and can also comprise a compressed air outlet 125 subjectable to the same pressure.

The control device 120 comprises a powder adjuster element 2° at which the target valve for the powder flow which the powder-dispensing device 1 is to supply per unit of time to the powder-spraying device 102 can be set.

Compressed conveying air can be reduced at a compressed conveying air outlet 126 of the control device 120 as a function of the target value of the powder flow volume able to be set per unit of time at the powder adjuster element 2°. The control device 120 calculates the target value for the volume of compressed conveying air flow needed per time unit for the powder-spraying device 102 as a function of the target value for the powder flow volume set per unit of time at the powder adjuster element 2°.

According to one preferential embodiment of the invention, the control device 120 also calculates the pump frequency of the powder-dispensing device 1 as a function of the target value set at powder adjuster element 2°.

When the powder-spraying device 102 is designed such that the spray dispersion of the coating powder is effected by atomized air, the control device 120 can be provided with an atomizer air outlet 127 to which the connection for an atomizer air line can be connected to supply compressed atomizer air to the powder-spraying device 102. The target value for the compressed atomizer air is set by the control device 120 and can preferably be variably adjustable by an atomized air adjuster element 3°.

When the powder-spraying device 102 is provided with an electrode flushing air duct for flushing the high-voltage electrode in order to prevent coating powder from adhering to the at least one electrode, the control device 120 can be provided with an electrode flushing air outlet 128, which can be detached from the electrode compressed air defined by the control unit 120, by the connection end of an electrode flushing air line being attached to the electrode air connection. An electrode flushing air adjuster element 4° can be provided on the control device 120 for adjusting the electrode flushing air.

When the powder-spraying device 102 is provided with one or more shaping compressed air channels for shaping the spray by means of shaping compressed air, the control device 120 can also be provided with a shaping compressed air outlet 129 to which the connection end of a shaping compressed air line of the powder-spraying device 102 can be connected. The shaping compressed air is defined by the control device 120. The control device 120 is preferably provided with a shaping air adjuster element 5° for adjusting the shaping compressed air.

The control device 120 is preferably further provided with an auxiliary compressed air outlet (not shown in the figures), from which an auxiliary flow of compressed air which is adjustable by the device control can be drawn per unit of time. The control device 120 can be provided with an auxiliary compressed air adjuster element 6° for adjusting the target value of the auxiliary compressed air flow.

According to one preferential embodiment of the invention, however, a total air adjuster element is provided on the control device in place of the auxiliary compressed air adjuster element for adjusting a target value for the entire flow of compressed air consisting of compressed conveying air per unit of time and compressed auxiliary air per unit of time. To this end, the device control can be designed such that it calculates the volume of compressed conveying air per unit of time as a function of the powder adjuster element settings and provides it at the compressed conveying air outlet and calculates the auxiliary compressed air volume per unit of time as a function of said compressed conveying air per unit of time and the setting on the total air adjuster element and adjusts it at the auxiliary compressed air outlet such that the total compressed air volume per unit of time always corresponds to the target value as set at the total air adjuster element.

The connection end of an auxiliary compressed air line can be connected to the auxiliary compressed air outlet of the control device 120 for supplying auxiliary compressed air into the powder flow path at a point between the powder-dispensing device 1 and the spray opening of the powder-spraying device 102, for example and preferably at the powder inlet at the rear end of the powder-spraying device where the powder-dispensing line is connected to the powder-spraying device.

A pneumatic circuit 200 is used to operate the powder-dispensing device 100 which is likewise integrated into the housing 20 of the powder-dispensing device 1 and comprises a plurality of control valves and one or more pressure regulators. The control device 120 controls the pneumatic circuit 200 via control signals of the device control which the control device 120 transmits to the pneumatic circuit 200.

According to one preferential embodiment of the invention, the device control is designed to recognize the type of spray gun connected to the control device or to the powder-dispensing device 1 respectively. Preferably, automatically predefined programs which can comprise adjustable parameters are then run, whereby these programs are coating programs adapted to the type of spray gun.

The control device 120 further serves in controlling the operation of the powder-dispensing device 1. To this end, the control device 120 is designed to suitably control the individual controllable components of the powder-dispensing device 1, in particular control valves V1, V2, V3, V4 and V5, and coordinate their actuation.

The control device 120 is preferably designed so as to open control valve V4 in preparation for the suction phase of the powder feed chamber 4 so that the compressed air in the pressure accumulator 57, or provided by the compressed air source 58 respectively, will be channeled into the pressure chamber of the powder outlet valve 8 designed as a pinch valve through the compressed air supply line 56 and the air exchange opening 16. As a result, the flexible elastic tube of the powder outlet valve 8 designed as a pinch valve is squeezed together, in consequence of which the powder outlet valve 8 closes the powder path provided by the flexible elastic tube.

With the closing of the powder outlet valve 8, the control device 120 fluidly connects the air exchange opening 13 provided in the housing 12 of the powder feed chamber 4 to the vacuum source 52 in order to generate a negative pressure in the interior of the powder feed chamber 4 so that coating powder can be sucked into the powder feed chamber 4 through the powder inlet 2 of the powder-dispensing device 1 and the (opened) powder intake valve 7 as well as the powder inlet 5 of powder feed chamber 4.

According to one preferential embodiment of the invention, in order to initiate the suction phase of the powder-dispensing device 1, the control device 120 generates a control signal to produce the negative pressure in the powder feed chamber 4 no earlier than or preferably at a predetermined time delay after a control signal to open the powder intake valve 7 so that the negative pressure builds up in the powder feed chamber 4 no earlier than simultaneously with the powder intake valve 7 opening, preferably at the cited predetermined time delay after the powder intake valve 7 opens. The predetermined time delay is preferably in the range of between 0 ms and 50 ms at a conveying cycle of the powder feed chamber 4 of approximately 200 ms.

This thereby achieves the negative pressure in the powder feed chamber 4 being less influenced from an opening movement of the powder intake valve 7, particularly when it is a pinch valve, at least at that point in time at which the powder intake valve 7 begins its opening movement, than is the case in the prior art where a drop in pressure has usually already occurred prior to the opening of the powder intake valve in the respective powder feed chamber.

Thereafter, the control valve V3 is fluidly connected to the compressed air supply line 56, in consequence of which a positive pressure is generated in the pressure chamber of the powder intake valve 7 designed as a pinch valve which effects a squeezing of the flexible elastic tube of the powder intake valve 7 designed as a pinch valve. Doing so closes the powder intake valve 7. The control valve V4 depressurizes the air exchange opening 17 of the pressure chamber of the powder outlet valve 8 designed as a pinch valve, respectively evacuates pressure chamber 15.2. Because of the elasticity of the tube of the powder outlet valve 8 designed as a pinch valve, it then immediately switches into its opened state.

At this moment or immediately thereafter, the control device 120 switches the control valve V1 so that the air exchange opening 13 formed in the housing 12 of the powder feed chamber 4 is fluidly connected to the compressed air source 58. The compressed air then flows into the powder feed chamber 4 through the compressed air supply line 50, the control valve V1, the intermediate chamber 11 and the filter element 10 and expels the portion of powder previously sucked into the powder feed chamber 4 through the powder outlet 6 of powder feed chamber 4.

With the help of the compressed conveying air fed into the powder feed chamber 4 through the compressed air supply line 50, the portion of powder is further conveyed through the opened powder outlet valve 8, the filter tube channel 18 of the auxiliary compressed air inlet device 9 and the powder outlet 3 of the powder-dispensing device 1.

The control device 120 is in particular designed to effect a pulsed feed of auxiliary compressed air into the powder path between the powder outlet valve 8 and the powder outlet 3 of the powder-dispensing device 1 by way of the auxiliary compressed air inlet device 9. It has hereby proven advantageous for the pulsed feed of auxiliary compressed air into the powder path by way of the auxiliary compressed air inlet device 9 to always be supplied over the entire period or during a predetermined or predeterminable partial period of the suction phase of the powder feed chamber 4 in order to in this way prevent and/or minimize active pulsations in the flow of powder dispensed from the powder-dispensing device 1.

The control device 120 is to this end in particular designed to always fluidly connect the air exchange opening 21 of the compressed air chamber 19 of the auxiliary compressed air inlet device 9 to the compressed air source 58 when the powder outlet valve 8 is closed.

In the embodiments shown in FIGS. 1 and 2, the control device 120 is moreover provided with an interface connection, by means of which a communication bus 131 of the control device 120 is led to the outside. This thereby selectively enables externally controlled operation (automatic operation) of the control device 120; in the embodiments as depicted, an external control comprising a remote control 140 and a remote processing unit 141 is utilized for this purpose.

Control and command signals as well as parameter signals are output via the communication bus 131 to the control device 120 or, respectively, from the control device 120 to the remote processing unit 141, by the remote control 140 and are processed in the external control in order to enable selective automatic operation. In order to provide robust and fail-safe operation with easy integration options into existing automated systems, the communication bus 131 is designed as a field bus, in particular a CAN bus or PROFIBUS.

In the embodiments of the powder-coating system 100 depicted in FIG. 2, the individual compressed air supply lines 50, 54, 56 and 59 are accommodated in the housing of the powder-dispensing device in which the compressed air supply of the individual components of the powder-dispensing device 1 and the powder-spraying device 102 are coordinated and controlled. In particular, the control device 120 likewise integrated into the housing of the powder-dispensing device 1 can also adjust the amount of auxiliary compressed air supplied to the powder-spraying device 102 per unit of time via the compressed air inlet of the powder-spraying device 102 which serves in the atomizing, shaping and/or otherwise influencing of the coating powder to be sprayed by the powder-spraying device 102 and/or the amount of electrode flushing air supplied to the powder-spraying device 102 per unit of time via the compressed air inlet of the powder-spraying device.

The present invention is not limited to the example embodiments depicted in the figures but rather yields from an integrated consideration of all the features disclosed herein.

What is claimed is:

1. A powder-dispensing device in the form of a dense phase powder pump or a powder injector for conveying coating powder from a powder reservoir to a powder-spraying device, wherein the powder-dispensing device comprises:
    a housing;
    a pneumatic circuit physically integrated into the housing of the powder-dispensing device and being configured to operate the powder-dispensing device; and
    a control device physically integrated into the housing of the powder-dispensing device and being configured to set at least one parameter which is characteristic in respect of a spray coating process effected with the powder-spraying device;
    wherein the control device is further configured to perform spray coating processes, wherein the control device comprises a storage device having a plurality of spray coating programs, wherein each spray coating program has at least one respective adjustable parameter, wherein the control device comprises at least one manually operable parameter adjuster element for setting a parameter target value for the at least one adjustable parameter, and wherein the control device comprises a visual display unit for automatically displaying the at least one set parameter target value; and
    wherein the control device is further designed to set at least one parameter which is characteristic in respect of a powder conveyance effected with the powder-dispensing device.

2. The powder-dispensing device according to claim 1, wherein the control device further comprises an interface connection as a lead for a communication bus of the control device designed to set the at least one parameter via a remote control and/or to communicate the at least one set parameter target value to a remote processing unit.

3. The powder-dispensing device according to claim 1, wherein the interface connection has a parallel or serial interface.

4. The powder-dispensing device according to claim 2, wherein the communication bus is designed as a field bus system.

5. The powder-dispensing device according to claim 1, wherein the control device is designed to set at least one of the following parameters characteristic of a spray coating process effected with the powder-spraying device:
    an electrode spray current of one or more high-voltage electrodes of the powder-spraying device;
    a high voltage at one or more high-voltage electrodes of the powder-spraying device;
    a volume of electrode flushing air supplied to the powder-spraying device per unit of time;
    a volume of shaping air to be supplied to the powder-spraying device per unit of time;
    an amount of coating powder to be supplied to the powder-spraying device per unit of time; and
    a volume of compressed conveying air to be supplied to the powder-spraying device together with the coating powder per unit of time.

6. The powder-dispensing device according to claim 1, wherein the control device is designed to set at least one of the following parameters characteristic of the powder conveyance effected with the powder-dispensing device:
    an amount of coating powder to be conveyed by the powder-dispensing device per unit of time; and
    a volume of compressed conveying air to be conveyed with the coating powder per unit of time.

7. The powder-dispensing device according to claim 1, wherein the at least one manually operable parameter adjuster element is further configured for setting a parameter target value for the at least one characteristic parameter of the powder conveyance effected with the powder-dispensing device.

* * * * *